United States Patent [19]
Nakajima et al.

[11] Patent Number: 5,357,351
[45] Date of Patent: Oct. 18, 1994

[54] IMAGE READING DEVICE

[75] Inventors: Yoshihiro Nakajima; Akihiro Takada, both of Osaka; Hiromi Yamashita; Noriyuki Tomita, both of Amagasaki, all of Japan

[73] Assignees: Mita Industrial Co., Ltd., Osaka; Mitsubishi Denki Kabushiki Kaisha, Tokyo, both of Japan

[21] Appl. No.: 18,690

[22] Filed: Feb. 17, 1993

[30] Foreign Application Priority Data

Feb. 21, 1992 [JP] Japan ................................. 4-034629

[51] Int. Cl.⁵ ........................................... H04N 1/028
[52] U.S. Cl. ............................... 358/482; 358/486; 358/496; 250/208.1
[58] Field of Search ............... 358/482, 483, 486, 494, 358/496, 474; 257/229, 443; 250/208.1

[56] References Cited

U.S. PATENT DOCUMENTS 4,642,472  2/1987  Ishikawa ..................... 250/208.1

FOREIGN PATENT DOCUMENTS 2-202265  8/1990  Japan .

*Primary Examiner*—Scott A. Rogers
*Attorney, Agent, or Firm*—Jordan and Hamburg

[57] ABSTRACT

An image reading device is movable at a predetermined speed relative to a document in a lengthwise direction of the document so as to read a document image and includes a plurality of image sensors arranged in line in a widthwise direction of the document, each image sensor including an array of first to n-th photoelectric conversion elements arranged at the same interval in line, and scan means for causing the array of photoelectric conversion elements of the respective image sensors to scan in the order of first to n-th at a predetermined period. The array of photoelectric conversion elements of the respective image sensors is arranged in such a way that the first photoelectric conversion element slips relative to the n-th photoelectric conversion element a predetermined distance in the direction opposite to the relative movement direction of the image sensor, the predetermined distance being defined by the predetermined relative movement speed and the predetermined period.

10 Claims, 13 Drawing Sheets

IMAGE READING DEVICE

BACKGROUND OF THE INVENTION AND RELATED ART STATEMENT

This invention relates to an image reading device which includes a plurality of image sensors arranged in a widthwise direction of a document, each image sensor including photoelectric conversion elements such as phototransistors arranged in line, so as to scan sequentially from one lateral end to the other lateral end in the widthwise direction to read a document image, and outputs read data to such apparatus as image forming apparatus.

Conventionally, in an image reading device for use in an image forming apparatus such as a facsimile machine, there is arranged in a widthwise direction of a document an image sensor including a photoelectric array in which photoelectric conversion elements such as photodiodes are arranged in line at a specified interval. The image reading device reads a document image by causing the image sensor to scan in the widthwise direction (hereinafter referred to as a main scanning) and by moving the image sensor or document relatively to scan in a lengthwise direction of the document (hereinafter referred to as a sub-scanning). For example, the document is moved in a direction opposite to a sub-scanning direction as shown in FIG. 12A, while the image sensor is moved in the same direction as the sub-scanning direction as shown in FIG. 12B.

There is a limit in the number of photoelectric conversion elements mounted on a single image sensor to keep a desired reading speed. Accordingly, the number of photoelectric conversion elements and the length of the image sensor become insufficient in the case where the document width is large. Thus, in this case, a plurality of image sensors are arranged side by side according to the document size, and is caused to scan in the same direction so as to read the document image. At this time, a microscope is used to arrange the image sensors lest they should slip relative to one another in the sub-scanning direction.

In this way, the array of photoelectric conversion elements sequentially scan so as to read the document image. Accordingly, there is a time difference between a reading timing of the first photoelectric conversion element and that of the last one. On the other hand, as described above, the image sensor and the document are moved relatively in the lengthwise direction of the document while the photoelectric array is being scanned. Accordingly, a reading track is inclined with respect to a main scanning direction. For example, as shown in FIG. 13, in the case where a straight line S on a document G is read by image sensors 1 to 4, a reproduced image of the straight line S becomes discontinuous due to a difference in scanning time between two successively operated image sensors.

More specifically, in the case of converting the light received analog signal from the photoelectric array into a digital signal of multiple bits, e.g., eight bits, as shown in FIG. 13, the reproduced image is liable to have irregularities at respective portions corresponding to boundaries between the juxtaposed image sensors 1 to 4.

Also, in the case of converting the light received analog signal into a digital signal of one bit, the reproduced image is liable to have discontinuities due to the fact that some photoelectric conversion elements on a reading completion end portion of the array do not reach the threshold level, and cannot read out the straight line G, and consequently generate white image data. Consequently, the document image cannot be reproduced accurately, and the appearance of the reproduced image is deteriorated.

As a measure against this problem, Japanese Unexamined Patent Publication No. 2-202265 discloses an image reading device in which adjacent image sensors are arranged such that main scanning directions thereof are alternately opposite to each other so as to correspond to the reading timings at boundaries between two successively operated image sensors, to thereby eliminate the aforementioned discontinuity in the output data from the image reading device.

In the image reading device disclosed in the above publication, however, since the main scanning directions of adjacent image sensors are alternately opposite to each other, wires are connected to one end of the respective image sensors alternately at opposite positions, thereby complicating the wiring. In addition, the image sensors are required to be arranged after discriminating the main scanning directions thereof, causing a reduction in the working efficiency. Further, when the reading tracks of the respective image sensors are connected, the reproduced image is bent, thereby deteriorating the reproducibility and appearance.

In order to solve this bending in the reproduced image, this prior art document discloses that the image sensors are arranged or inclined along the inclination of the reading tracks of the respective image sensors. However, this arrangement necessitates adjustment of the inclination of the respective image sensors, thus costing time and labor. Also, an adjusting operation requires skill since the inclination is adjusted by an extremely fine angle. In the arrangement of image sensors in the bending form, further, there is remarkably great space in the boundary between the image sensors, i.e., between the scanning completion end photoelectric conversion element of one image sensor and the scanning start photoelectric conversion element of the next image sensor. Consequently, this arrangement involves unreadable portions, and results in discontinuities in the reproduced image.

SUMMARY OF THE INVENTION

In view of the problems residing in the prior art, it is an object of the invention to provide an image reading device which can generate image data ensuring a reproduced image in a satisfactory appearance.

Accordingly, the present invention is directed to an image reading device which is movable at a predetermined speed relative to a document in a lengthwise direction of the document so as to read a document image, comprising: a plurality of image sensors arranged in line in a widthwise direction of the document, each image sensor including an array of first to n-th photoelectric conversion elements arranged at the same interval in line, the photoelectric conversion elements of one image sensor being arranged in the same direction as those of another image sensor, each photoelectric conversion element receiving reflected light from the document and generating image data corresponding to the intensity of the received reflected light; scan means for causing the array of photoelectric conversion elements of the respective image sensors to scan in the order of first to n-th at a predetermined period; and the array of photoelectric conversion elements of the respective image sensors being arranged in such a way that the first photoelectric conversion element slips relative to the n-th photoelectric conversion element a predetermined distance in the direction opposite to the relative movement direction of the image sensor, the predetermined distance being defined by the predetermined relative movement speed and the predetermined period.

With thus constructed image reading device, the image sensors are relatively moved to the document while the array of photoelectric conversion elements of the respective image sensors are caused to scan in the order of first to n-th at the predetermined period. The first photoelectric conversion element slips relative to the n-th photoelectric conversion element the predetermined distance in the direction opposite to the relative movement direction of the image sensor. Accordingly, this image reading device can eliminate the irregularity or discontinuity at the boundary between the image sensors.

Also, the image sensor may further be provided with a substrate in the form of a rectangle having two parallel long sides and two parallel short sides. The array of photoelectric conversion elements is arranged on the substrate in parallel with the long side of the substrate. The substrate is inclined at such an angle with respect to the widthwise direction of the document that the first photoelectric conversion element slips relative to the n-th photoelectric conversion element the predetermined distance.

Further, the substrate may be provided with a graduated scale on the short side.

Further, the plurality of image sensors may be further provided with rectangular substrates respectively. The plurality of image sensors are arranged in line in parallel with the widthwise direction of the document. The array of photoelectric conversion elements is arranged on the substrate in such a way that the first photoelectric conversion element slips relative to the n-th photoelectric conversion element the predetermined distance.

With these constructed image reading devices, the arrangement of the image sensors can be carried out more easily.

Furthermore, the image sensor may be further provided with a substrate in the form of a parallelogram having two parallel long sides and two parallel short sides. The array of photoelectric conversion elements is arranged on the substrate in parallel with the long side of the substrate. The substrate is inclined at such an angle with respect to the widthwise direction of the document that the short sides become parallel with the lengthwise direction of the document and the first photoelectric conversion element slips relative to the n-th photoelectric conversion element the predetermined distance.

Further, it may be appropriate that the distance between the end photoelectric conversion element of the array and the end of the substrate is made to be a half of the interval between the photoelectric conversion elements.

With thus constructed image reading devices, the image sensors can be easily arranged in the desired form. Also, the interval between the respective end photoelectric elements of the arrays can be made to be identical to the interval of the photoelectric conversion elements.

Moreover, the predetermined distance dL is defined as $dL = T_o \times V$ wherein $T_o$ denotes the predetermined period and V denotes the predetermined relative movement speed.

DETAILED DESCRIPTION OF PREFERRED EMBODIMENTS OF THE INVENTION

Figure 1:
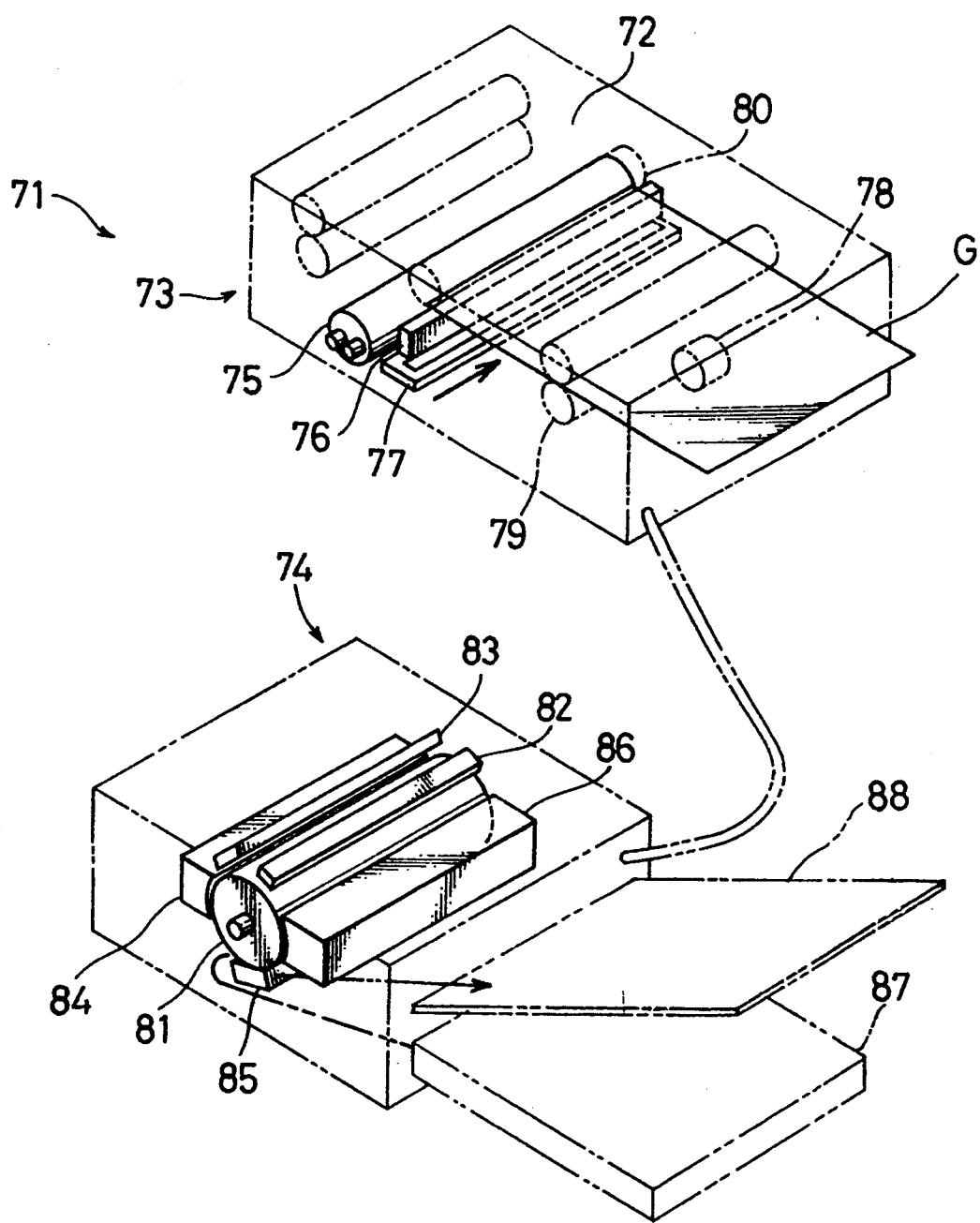
FIG. 1 is a perspective view showing a schematic construction of an image forming apparatus incorporating an image reading device according to the invention.

There will be first described a schematic construction of an image forming apparatus incorporating an image reading device according to the invention with reference to FIG. 1.

An image forming apparatus 71 is provided with an image reading unit 73 and an image forming unit 74. In FIG. 1, the image reading unit 73 and the image forming unit 74 are separated so as to facilitate the understanding of their construction.

The image reading unit 73 includes an exposure lamp 75 for exposing a document, an optical system having a life magnification forming element 76 such as a rod lens array for focusing a reflected light from the document on an image sensor array to be described later, and the like, and an image reading device having the image sensor array 77 for reading a document image by the reflected light as image data.

The image forming unit 74 includes a photosensitive member 81, a charger 82, an LED array 83, a developing device 84, a transfer device 85, a cleaner 86, etc.

An image forming operation will be described summarily next. A document G is fed by a feed roller 78. The document G reflects light from the exposure lamp 75 while being transported by a pair of transport rollers 79 and a transport roller 80. This reflected light is converged and focused on the image sensor array 77 by the life magnification focusing element 76. On the other hand, the surface of the photosensitive member 81 is exposed to an image light emitted from the LED array 83 based on the image data read by the image sensor array 77 after being charged uniformly by the charger 82, and thereby an electrostatic latent image is formed thereon. Charged toner is supplied to the photosensitive member 81 from the developing device 84 to deposit on the electrostatic latent image to thereby form a toner image.

On the other hand, a sheet is fed to the image forming unit 74 by unillustrated feed means from a cassette 87, and the toner image is transferred to the sheet by the transfer device 85. The sheet is separated from the photosensitive member 81, and is discharged onto a discharge tray 88 from the image forming unit 74 after having the toner image fixed thereto. The cleaner 86 cleans the toner residual on the surface of the photosensitive member 81 after the image forming operation.

There will be described a first image reading device according to the invention next with reference to FIGS. 2 to 8.

Figure 2:
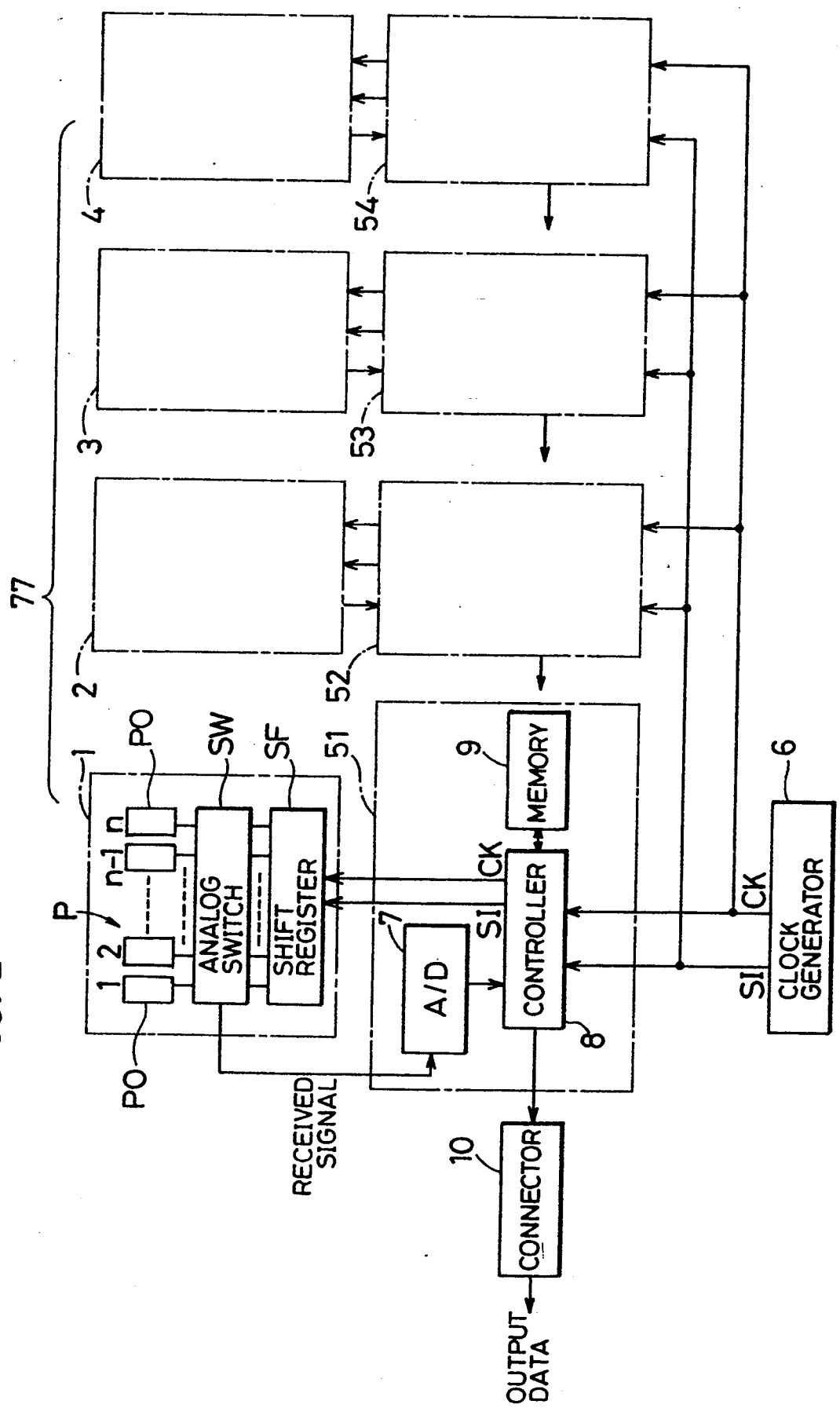
FIG. 2 is a block diagram showing a control system of the image reading device embodying the invention.

The image reading device is, as shown in FIG. 2, provided with the image sensor array 77 including scanning type image sensors 1 to 4, image data output units 51 to 54, a clock generator 6, etc. The image reading device is adapted for reading an image of the document while moving the document in a lengthwise direction (opposite to the sub-scanning direction) and for outputting the read image data through a connector 10. Since the document is scanned relatively in the sub-scanning, it may be appropriate to fix the document while moving the optical system and image sensor array in the sub-scanning direction.

The clock generator 6 outputs a main scanning start signal SI and a clock signal CK to the respective image data output units 51 to 54 so as to cause the image sensors 1 to 4 to execute the main scanning.

Figure 3:
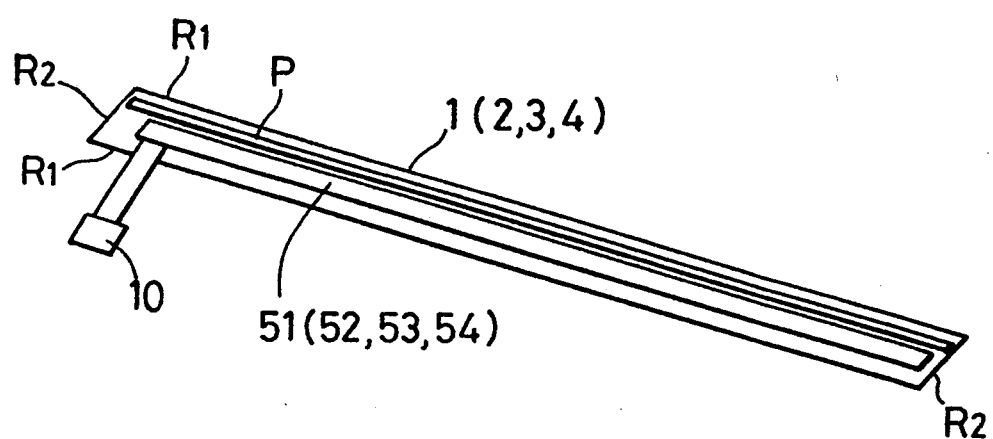
FIG. 3 is a perspective view showing an image sensor and an image data output unit of the image reading device.

Each of the image data output units 51 to 54 includes an AD converter 7, a data controller 8, a memory 9, etc. As shown in FIG. 3, the image data output units 51 to 54 and the corresponding image sensors form integral units. The AD converter 7 converts light received signals from the image sensors 1 to 4 into digital data (image data), e.g., digital data of one bit, and outputs the converted data to the data controller 8.

The data controller 8 applies the level correction to the image data from the AD converter 7, and outputs the image data as an output data externally through the connector 10. The output data is transmitted to an external device such as a printer and a facsimile machine, which forms an image in accordance with the output data. Further, the data controller 8 sends the main scanning start signal SI and the clock signal CK from the clock generator 6 to the image sensors 1 to 4. The memory 9 includes a RAM, a ROM, or the like, and stores an initialization data, a control program, and like data.

Figure 4:
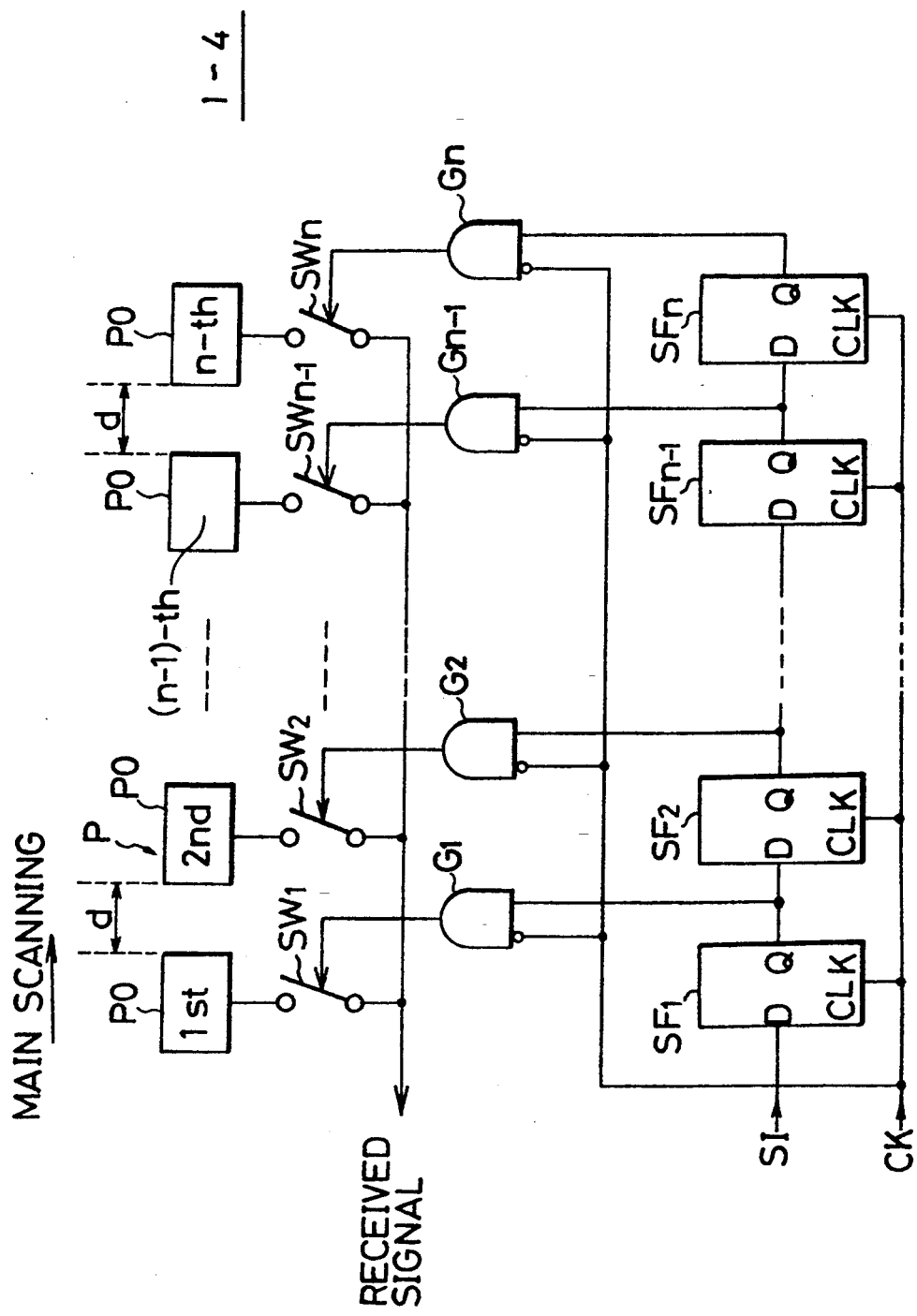
FIG. 4 is a circuit diagram of the image sensor.

The image sensor 1 is provided with a photoelectric array P including n photoelectric conversion elements (n pixels) P0 arranged side by side at an interval d, shift registers SF1 to SFn connected in correspondence with the respective photoelectric conversion elements P0, gates G1 to Gn, and analog switches SW1 to SWn as shown in FIG. 4. Further, as shown in FIG. 3, the image sensor 1 has a rectangle substrate having long sides R1 and short sides R2, and a line of photoelectric conversion elements P0 are arranged in parallel with the long sides R1. The other image sensors 2 to 4 respectively have substrates shaped similarly. The arrangement of the image sensors 1 to 4 will be described later.

The respective photoelectric conversion elements P0 receive the light from the document for a predetermined period, and output light received signals (analog signals) representative of an amount of stored light energy to the image data output units 51 to 54 through the analog switches SW1 to SWn. The photosensor array P reads the document image by a specified reading distance in a direction normal to the main scanning direction in each main scanning.

The shift registers SF1 to SFn turn the analog switches SW1 to SWn on one after another for a period corresponding to a low level duration of the clock signal CK each time the clock signal CK is input thereto.

There will be described a light receiving operation of the photoelectric array P, i.e. a reading operation of the document image, next with reference to FIGS. 4 and 5.

Figure 5:
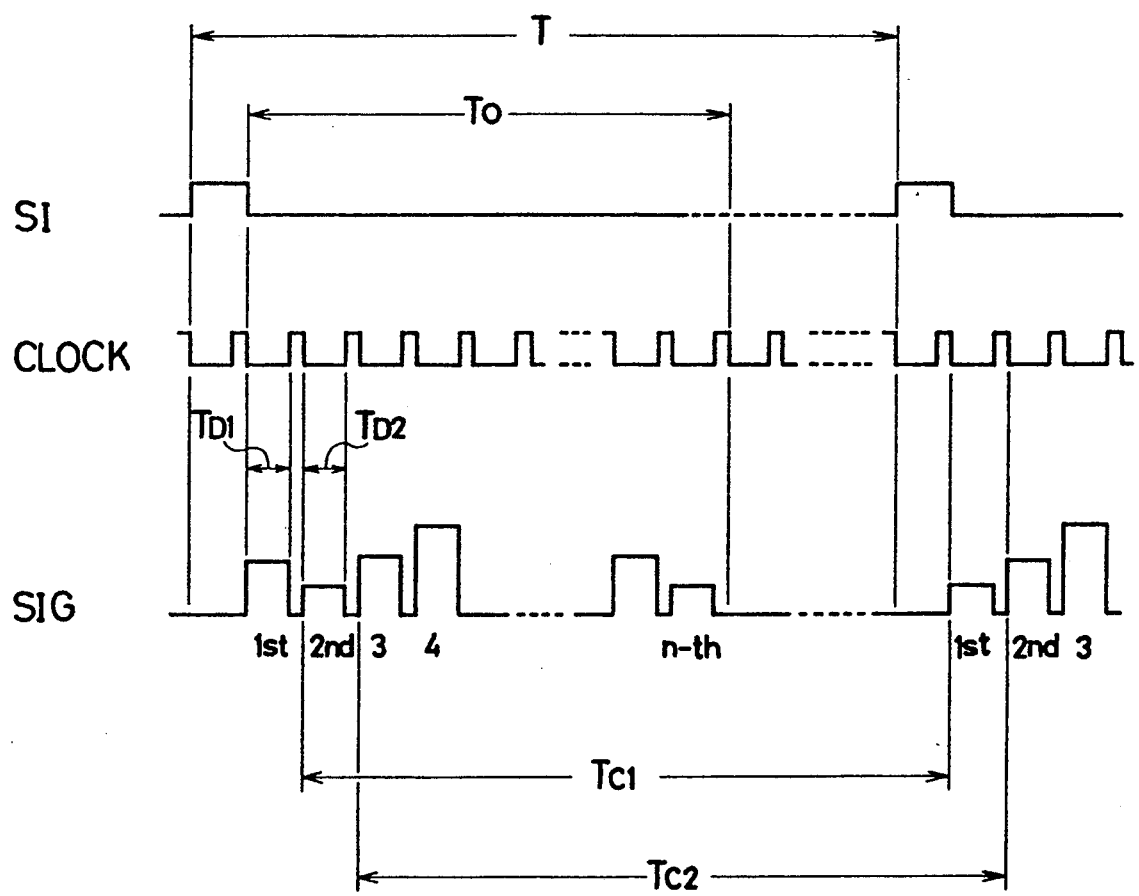
FIG. 5 is a timing chart showing a reading timing from the image sensor and a light received signal.

The shift register SF1 outputs a high level signal from a terminal Q when the high level main scanning start signal SI is input to a terminal D thereof and the high level clock signal CK is input to a terminal CLK thereof, thereby turning on the analog switch SW1 for the low level duration of the clock signal CK by the gate G1 to output the light received signal representative of the light energy stored in the first photoelectric conversion element P0 (Td1 in FIG. 5). The shift register SF1 also outputs a high level signal to a terminal D of the shift register SF2. When a next high level clock signal CK is input to a terminal CLK of the shift register SF2, the shift register SF2 outputs a high level signal from a terminal Q thereof, thereby turning on the analog switch SW2 for the low level duration of the clock signal CK by the gate G2 to output the received signal representative of the light energy stored in the second photoelectric conversion element P0 (TD2 in FIG. 5).

In this way, the analog switches are turned on one after another and the light received signals representative of the light energy stored in the respective photoelectric conversion elements P0 are output. In other words, the image sensors 1 to 4 output the light received signals from the first to the n-th photoelectric conversion elements to the image data output units 51 to 54 in synchronism with the clock signal CK upon receipt of the main scanning start signal S input in a cycle of T.

The light received signals of the first to the n-th photoelectric conversion elements are output within a period of T0. The respective photoelectric conversion elements P0 store the light energy from the document while the analog switches SW1 to SWn are off. For example, light storing periods of the first and second photoelectric conversion elements are Tc1, Tc2 (where Tc1=Tc2).

Figure 6:
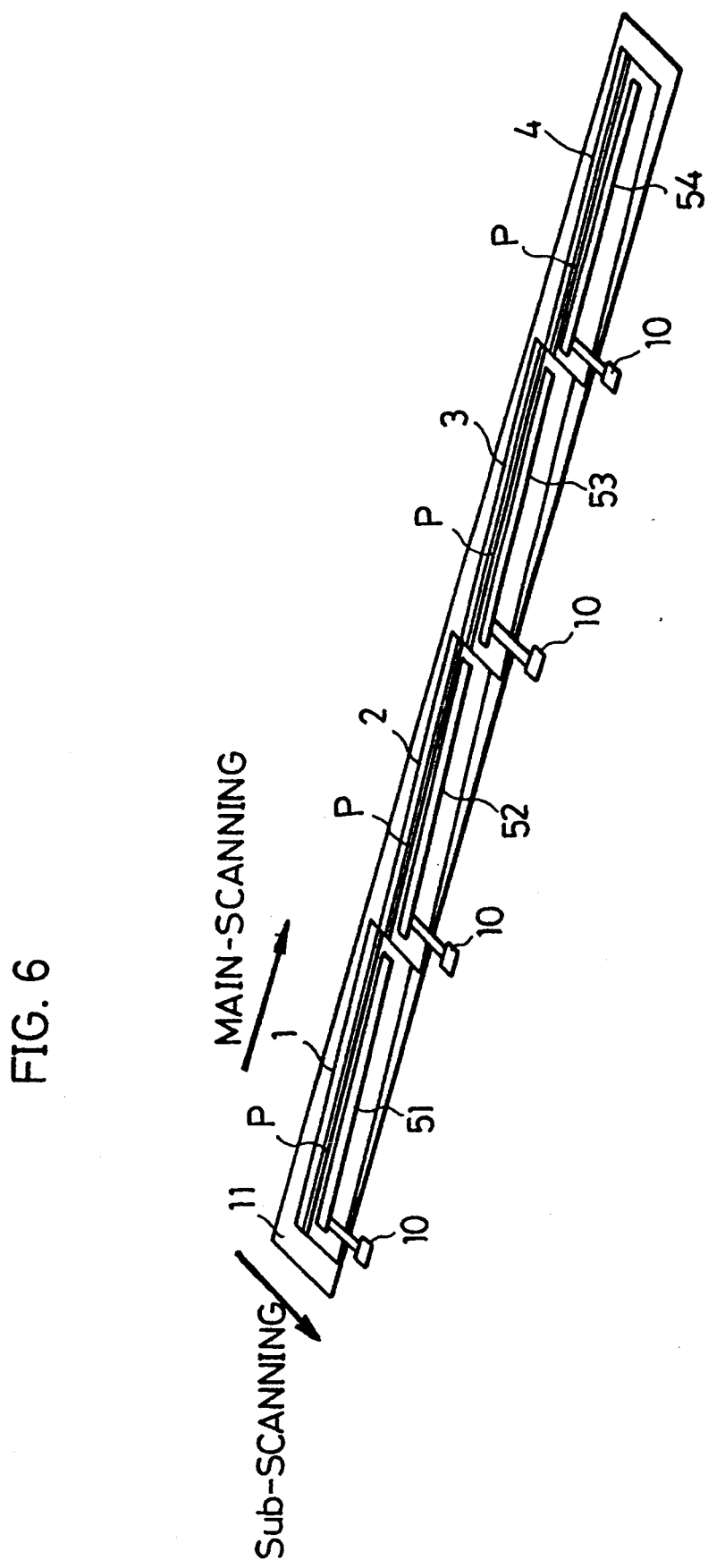
FIG. 6 is a perspective view showing an arrangement of the image sensors provided in a first image reading device.
Figure 7:
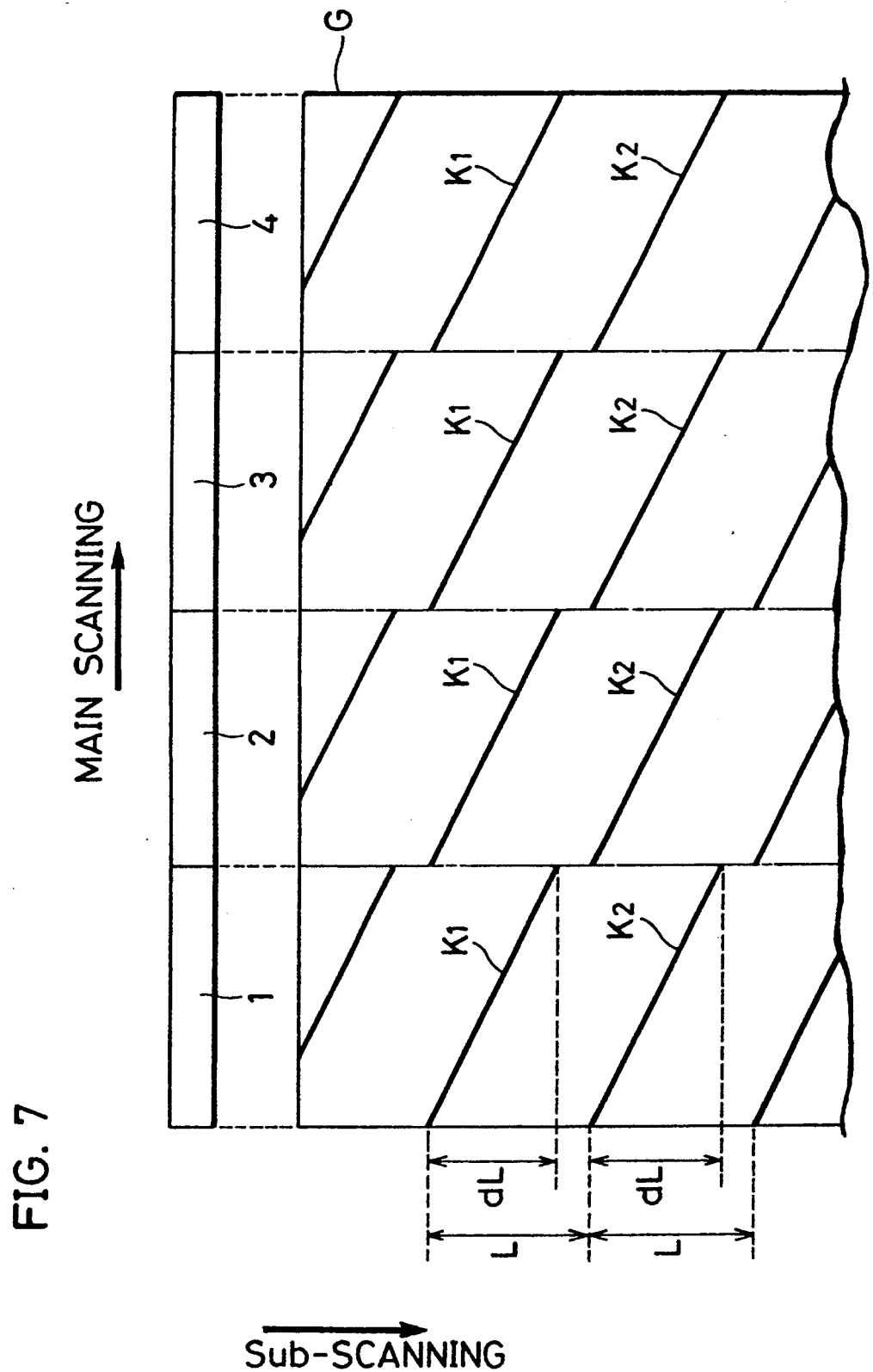
FIG. 7 is a diagram showing tracks on the document along which the image sensors scan.

The arrangement of the respective image sensors 1 to 4 will be described with reference to FIGS. 6 to 8. The respective image sensors 1 to 4 are fixedly arranged side by side in the main scanning direction on a base plate 11 as shown in FIG. 6. The image sensors 1 to 4 are secured on the base plate 11 with adhesive or the like after being adjusted so as to incline at a specified angle in the opposite sub-scanning direction.

Here, description will be given on the meaning of inclining the image sensors 1 to 4, i.e. the respective photoelectric arrays P, with respect to the main scanning direction with reference to FIG. 7.

A document G is moved in the direction opposite to the sub-scanning direction by a distance dL for a period T0 (see FIG. 5) during which the image sensors 1 to 4 execute the main scanning from the first photoelectric conversion element P0 to the n-th photoelectric conversion element P0, and further by a distance L during an image reading cycle, i.e. the cycle T of the main scanning start signal SI (FIG. 5). Accordingly, tracks of the light received signals output from the respective photoelectric conversion elements P0 of the image sensors 1 to 4 on the document G are as indicated by straight lines K1, K2, K3 . . .

It will be apparent that if the photoelectric array P is inclined with respect to the widthwise direction of the document in such a way that the n-th photoelectric conversion element slips relative to the first photoelectric conversion element by the distance dL in a direction opposite to the reading track, i.e., in the opposite sub-scanning direction, this is equivalent to the photoelectric array P reading the document image from the first to the n-th photoelectric conversion elements simultaneously in a direction normal to the sub-scanning direction.

This slip distance dL is calculated as follows:

$$dL = (T0/T) * L$$
$$= (n/f)/T * L$$

where T0=main scanning period (FIG. 5), T=reading cycle (FIG. 5), L=line space in the sub-scanning direction, n=number of photoelectric conversion elements, f=photoelectric conversion element clock frequency, and T0=n/f.

The slip distance dL will be described in detail using a numerical example in which the photoelectric array P has a resolution of 400 dpi in both the main scanning direction and the sub-scanning direction and the document size is A4 size (210 mm). At this time, the reading width W is:

$$W = 25.4(mm)/400 = 63.5\ (\mu m) \qquad (1)$$

On the other hand, the line space L is designed as follows if T=1 millisecond (msec) and a transport speed of the document=60 mm/sec:

$$L = 60(mm/sec) * 1(msec) = 60(\mu m) \qquad (2)$$

Since L<W, no blank region exists where the document image is not read.

Further, the number n of photoelectric conversion elements P0 is:

$$n = 210(mm)/63.5(\mu m) = 3307 \qquad (3)$$

If these are scanned at a frequency f=4.3 MHz, the main scanning period T0 is:

$$T0 = n/f = 0.77(msec) \qquad (4)$$

Since T0<T, the photoelectric array P operates in a normal manner. The slip distance dL at this time is:

$$dL = (T0/T) * L \qquad (5)$$
$$= 46.2\ (\mu m)$$

Figure 8:
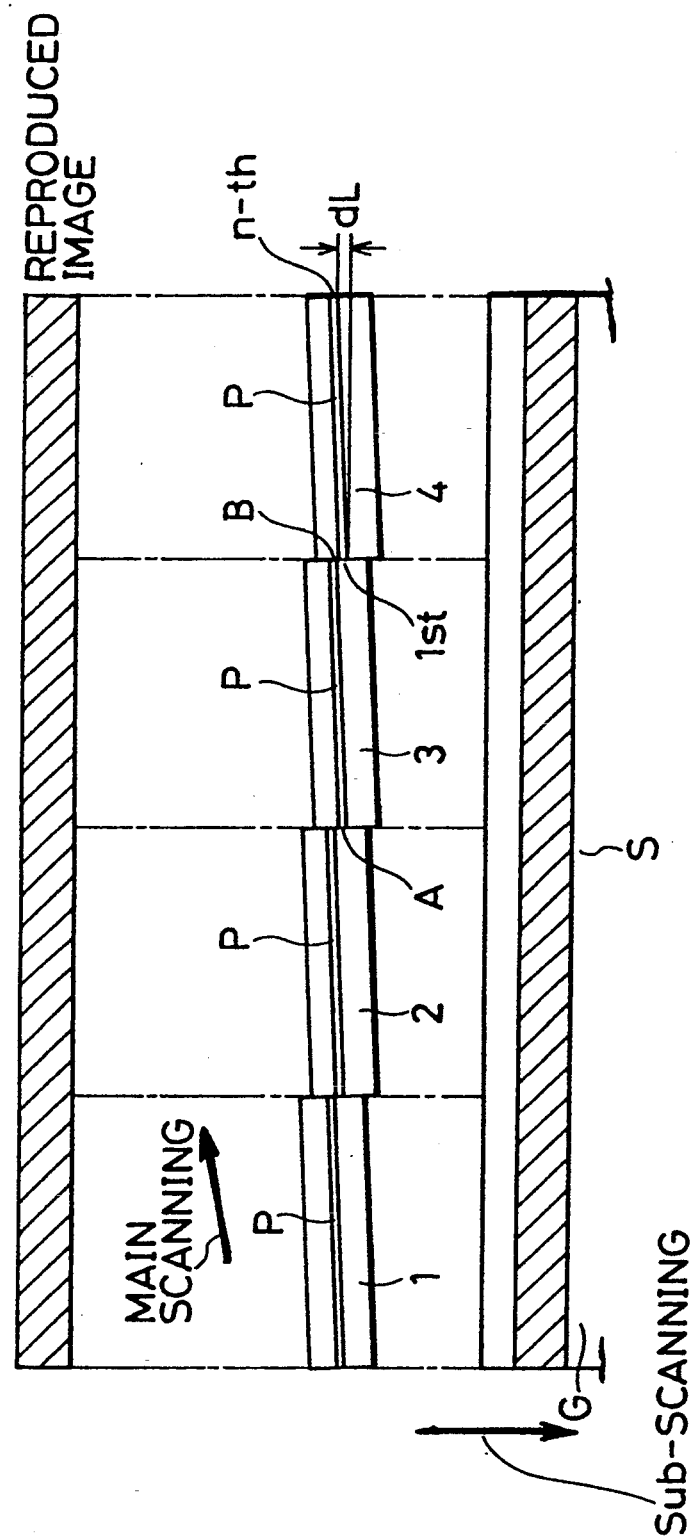
FIG. 8 is a diagram showing a relationship between a document image, reproduced image, and image sensor array of a first image reading device of the invention.

In this way, the photoelectric conversion element arrays of the image sensors 1 to 4 are inclined with respect to the widthwise direction in such a way that a main scanning completion end (n-th photoelectric conversion element of the photoelectric array P) B slips in the opposite sub-scanning direction by the distance dL relative to a main scanning start end (first photoelectric conversion element, of the photoelectric array P) A as shown in FIG. 8. With this arrangement, in reading a straight line image S on the document G, even if the straight line S moves upward in the drawing of FIG. 8 while the sub-scanning is executed, the photoelectric arrays P executes the main scanning obliquely along the straight line S according to the movement of the straight line S. As a result, the straight line image S is read as it is. Thus, the above arrangement prevents the irregularity and discontinuity from occurring in the image data and improves the reproducibility to a satisfactory level when the images are formed based on the image data by the external device.

If the document G is moved in the opposite sub-scanning direction more than the reading width of the photoelectric arrays P during the cycle T of the main scanning start signal SI input from the data controller 8, there is created a region where the image reading is not carried out. In view of this, as shown in the equation (5), the moving distance L of the document G in the opposite sub-scanning direction during the cycle T is set smaller than the reading width W of the photoelectric arrays P. Thus, the slip distance dL does not exceed one reading width W of the photoelectric conversion element arrays P.

Also, it may be appropriate to convert the light received signal from the image sensors 1 to 4 into digital data of multiple bits, e.g., eight bits, by the A/D converter 7, and then send the digital data of multiple bits to the data controller 8. In this way, an improved reproduced image can be obtained.

Figure 9:
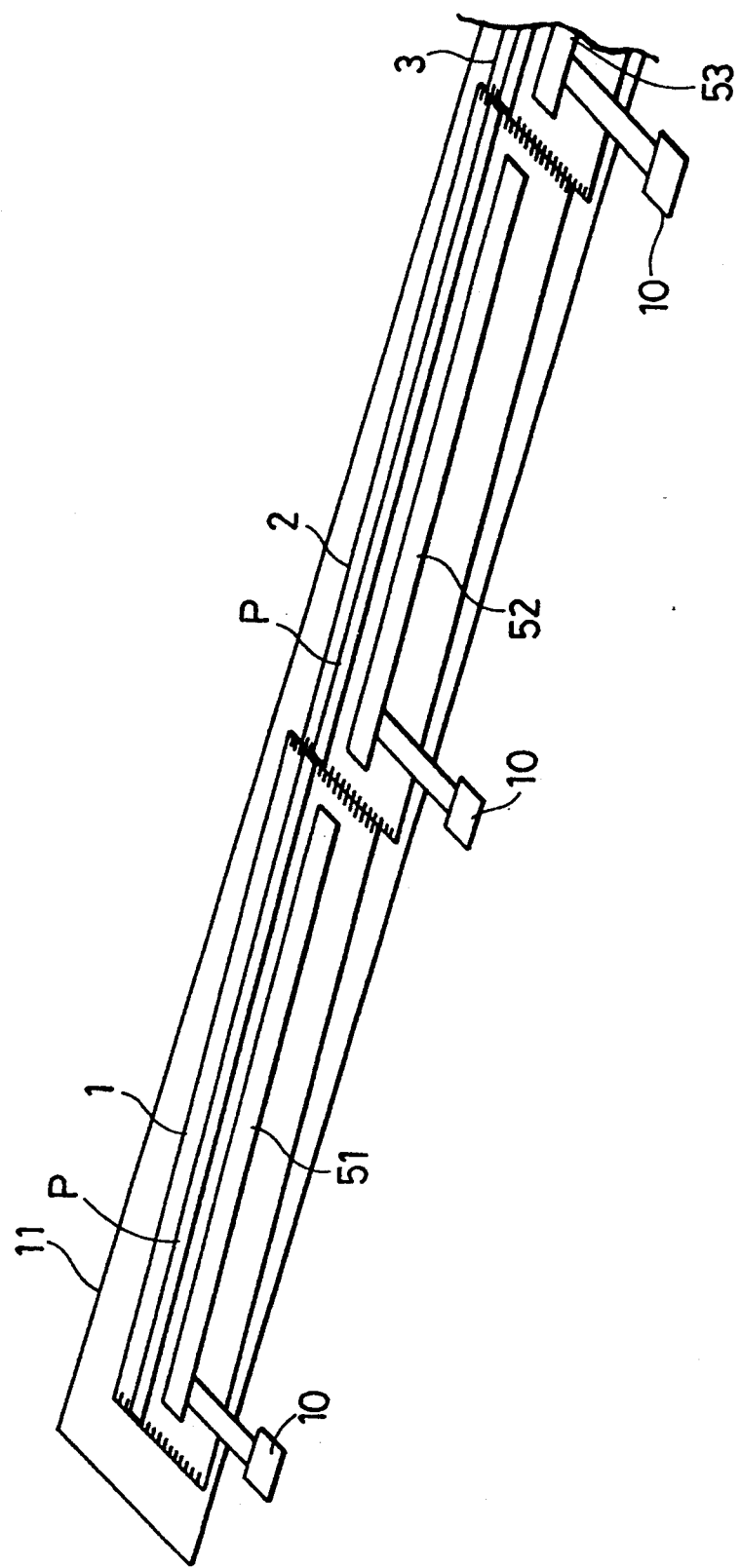
FIG. 9 is a perspective view showing a part of image sensors provided in a second image reading device embodying the invention.

There will be described a second image reading device embodying the invention next with reference to FIG. 9.

Image sensors 1 to 4 each have a substrate provided with graduated scales on opposite ends thereof. With these scales, the inclination of the photoelectric arrays can be adjusted easily when arranging the image sensors 1 to 4.

Figure 10:
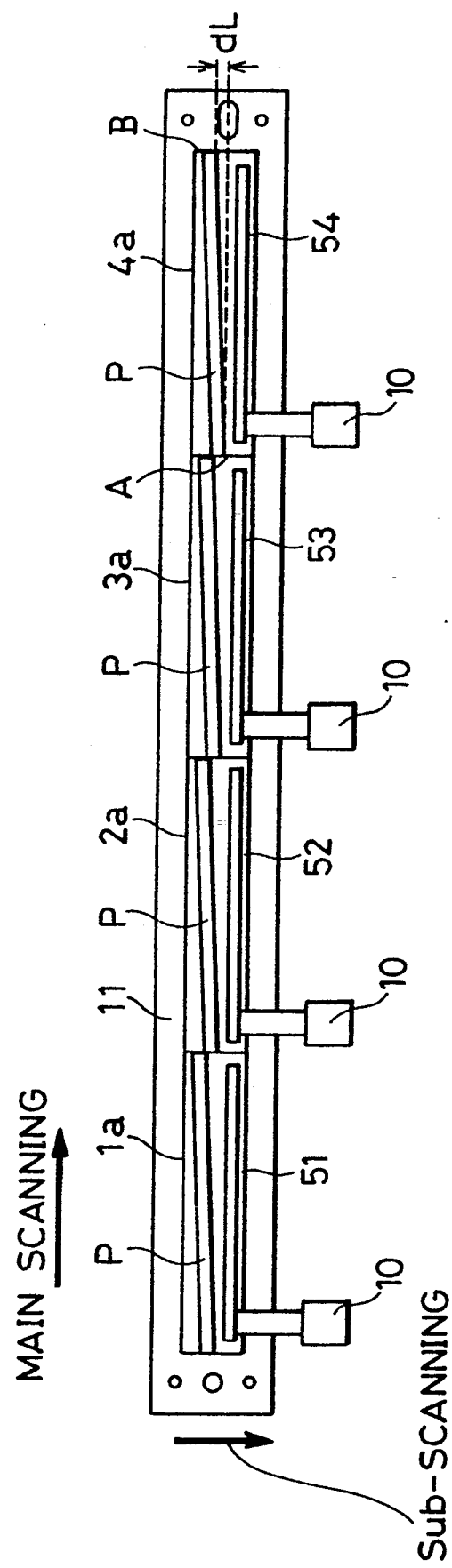
FIG. 10 is a plan view showing image sensors provided in a third image reading device embodying the invention.

There will be described a third image reading device embodying the invention next with reference to FIG. 10.

In each of image sensors 1a to 4a, a photoelectric array P is inclined in advance such a way that a main scanning completion end B slips the opposite sub-scanning direction by the slip distance dL relative to a main scanning start end A. This obviates the need for adjustment of the inclination of their respective substrates, and allows the substrates to be arranged linearly, thereby facilitating the arrangement thereof.

Figure 11:
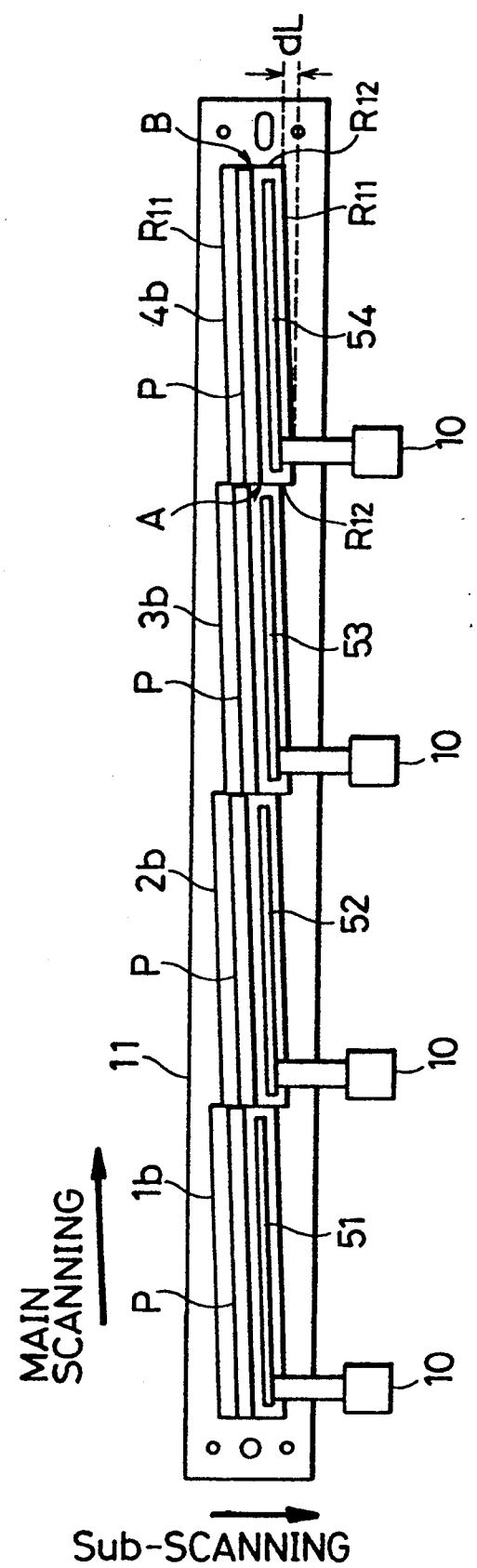
FIG. 11 is a plan view showing image sensors provided in a fourth image reading device embodying the invention.
Figure 12A:
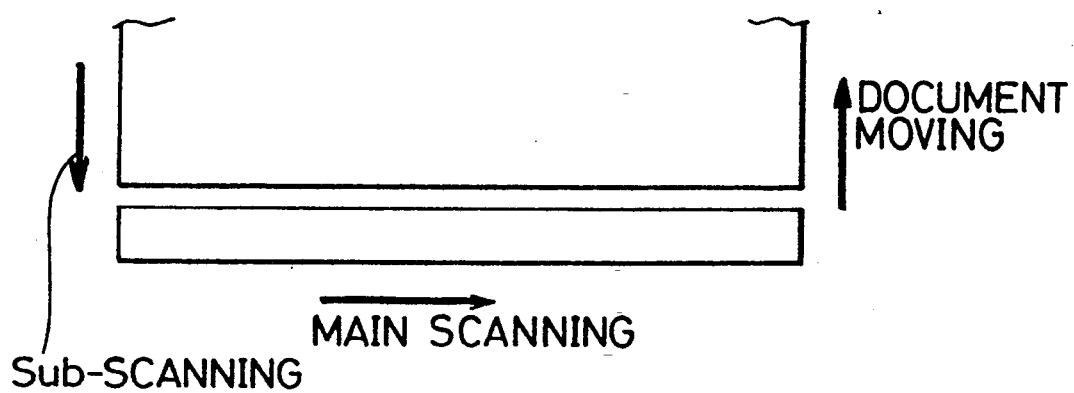
FIGS. 12A, 12B are diagrams showing a relationship between a sub-scanning direction and a moving direction of the document and the image sensor respectively.
Figure 12B:
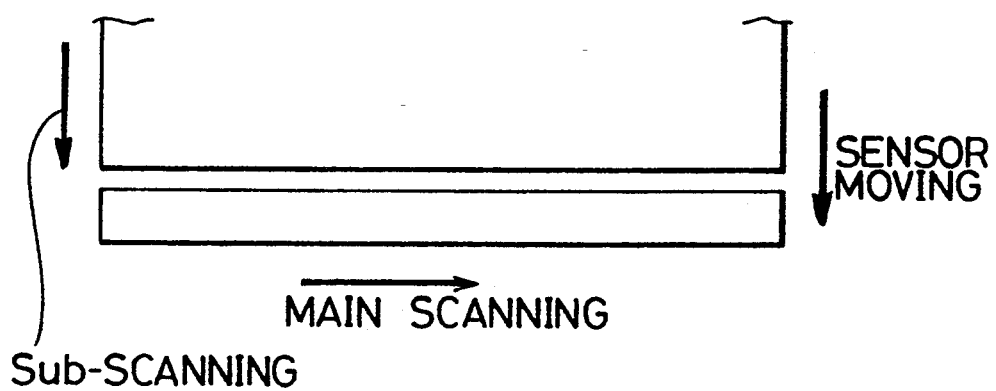
Figure 13:
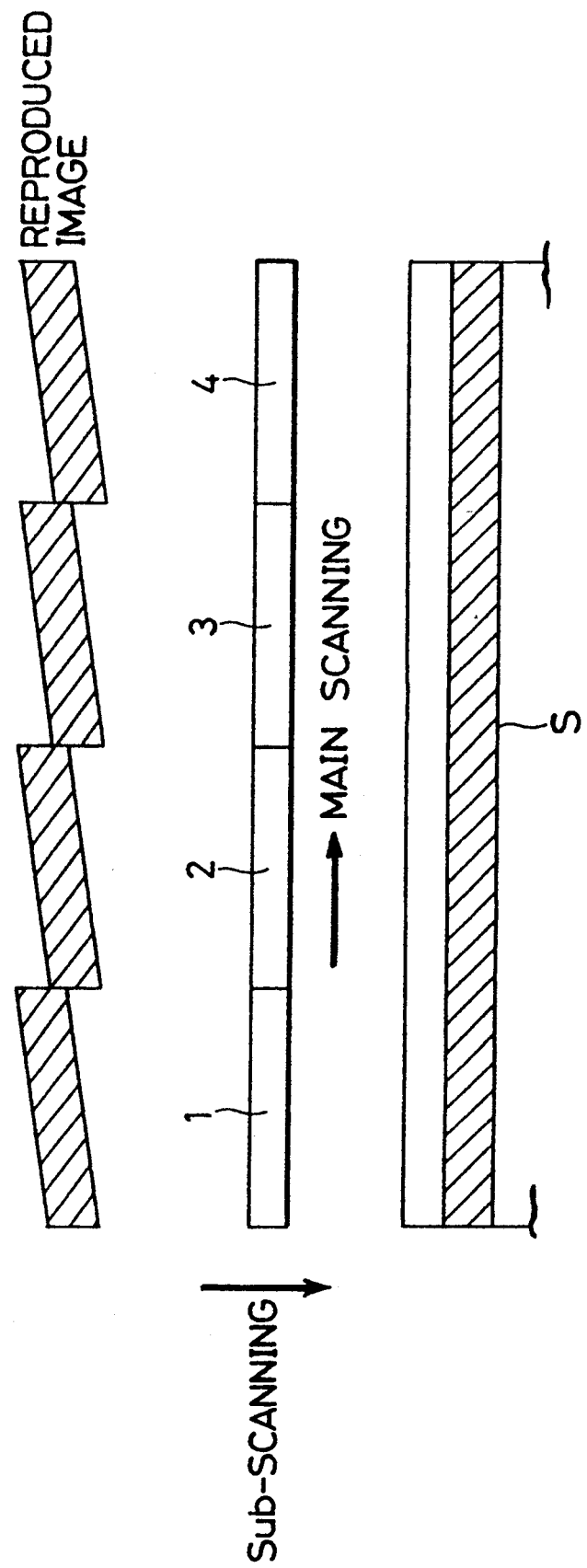
FIG. 13 is a diagram showing a relationship between a document image, reproduced image, and image sensor array of an image reading device of the prior art.

There will be described a fourth image reading device embodying the invention next with reference to FIG. 11.

Image sensors 1b to 4b each have a substrate in the form of a parallelogram having long sides R11 and short sides R12. and photoelectric arrays P thereof are arranged in parallel with the long sides R11. The long sides R11 are inclined such that a main scanning completion end B slips in the opposite sub-scanning direction by the slip distance dL relative to a main scanning start end A, whereas the short sides R12 extend in parallel with the lengthwise direction of the document.

Further, the distance between the main scanning start end A of the photoelectric array P and the short left side R12 of the parallelogram substrate, and the distance between the main scanning completion end B and the short right side R12 are made to be a half of the interval d between the photoelectric conversion elements P0. Accordingly, the intervals between the respective main scanning completion ends B of the photoelectric arrays 1b to 4b and the respective main scanning start ends A of the photoelectric arrays 1b to 4b are the same as the interval d of the photoelectric conversion elements P0.

Further, it is preferable to provide the opposite ends of each image sensor with graduated scales similar to the second embodiment to assure easy adjustment in the arrangement of the image sensors 1b to 4b.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image reading device for reading an image on a document which is moving at a predetermined relative movement speed in a lengthwise direction of the document, the device comprising:
   a base plate;
   a plurality of image sensors attached on the base plate, each image sensor including:
      a substrate in the form of a strip extending in a widthwise direction of the document, the substrate having reference mark means for attachment on either end thereof;
      an array of first to n-th photoelectric conversion elements arranged on the substrate in a straight line along the widthwise direction of the document, with an identical spaced photoelectric conversion element interval between adjacent elements, each photoelectric conversion element receiving reflected light from the document and generating image data corresponding to the intensity of the received reflected light;
      an array of shift registers arranged on the substrate along the photoelectric conversion array and connected in correspondence with the respective photoelectric conversion elements for scanning the photoelectric conversion array in an order of first to n-th elements at a predetermined scanning period; and
      reference mark means at at least one end thereof for aligning the image sensors relative to each other; and
   the plurality of image sensors being attached on the base plate side by side in the widthwise direction of the document by:
      attaching a first said image sensor on the base plate in a position of the photoelectric conversion array lying at a predetermined inclination angle with respect to the widthwise direction of the document, the predetermined inclination angle being defined by the predetermined relative movement speed and the predetermined scanning period; and
      attaching a second said image sensor on the base plate in the position of the photoelectric conversion array lying at the predetermined inclination angle after adjusting, based on the reference mark means on the first and second image sensors, a lengthwise space between the first element of the second image sensor and the n-th element of the first image sensor to a predetermined distance in a direction opposite to the relative movement direction of the image sensor, the predetermined distance being defined by the predetermined relative movement speed and the predetermined scanning period.

2. An image reading device as defined in claim 1, wherein the second image sensor is attached on the base plate after further adjusting, based on the reference mark means on the first and second image sensors, a widthwise space between the first element of the second image sensor and the n-th element of the first image sensor to a distance equal to or smaller than the photoelectric conversion element interval.

3. An image reading device as defined in claim 1, wherein the reference mark means includes a graduated scale.

4. An image reading device as defined in claim 1, wherein:
   the substrate has a rectangular shape with two parallel short sides extending along the lengthwise direction of the document and two parallel long sides extending along the widthwise direction of the document; and
   the photoelectric conversion array includes a predetermined number of photoelectric conversion elements arranged along a straight line inclined at the predetermined inclination angle with respect to the long sides of the substrate.

5. An image reading device as defined in claim 1, wherein:
   the substrate is shaped into a parallelogram having two parallel short sides extending along the lengthwise direction of the document and two parallel long sides extending along the widthwise direction of the document, the long sides being inclined at the predetermined inclination angle with respect to the widthwise direction of the document; and
   the photoelectric conversion array includes a predetermined number of photoelectric conversion elements arranged in parallel with the long sides of the substrate.

6. An image reading device for reading an image on a document which is moving at a predetermined relative movement speed in a lengthwise direction of the document, the device comprising:
   a base plate;
   a plurality of image sensors attached on the base plate, each image sensor including:
      a substrate in the form of a strip extending in a widthwise direction of the document, the substrate having reference mark means for attachment on either end thereof;
      an array of first to n-th photoelectric conversion elements arranged on the substrate in a straight line along the widthwise direction of the document, with an identical spaced photoelectric conversion element interval between adjacent elements, each photoelectric conversion element receiving reflected light from the document and generating image data corresponding to the intensity of the received reflected light;
      an array of shift registers arranged on the substrate along the photoelectric conversion array and connected in correspondence with the respective photoelectric conversion elements for scanning the photoelectric conversion array in an order of first to n-th elements at a predetermined scanning period; and reference mark means at at least one end thereof for aligning the image sensors relative to each other; and the plurality of image sensors being attached on the base plate side by side in the widthwise direction of the document such that:

a first said image sensor is attached on the base plate in a position of the photoelectric conversion array lying at a predetermined inclination angle with respect to the widthwise direction of the document, the predetermined inclination angle being defined by the predetermined relative movement speed and the predetermined scanning period; and a second said image sensor is attached on the base plate in the position of the photoelectric conversion array lying at the predetermined inclination angle with a lengthwise space between the first element of the second image sensor and the n-th element of the first image sensor being set to a predetermined distance in a direction opposite to the relative movement direction of the image sensor, based on the reference mark means on the first and second image sensors, the predetermined distance being defined by the predetermined relative movement speed and the predetermined scanning period.

7. An image reading device as defined in claim 6, wherein the second image sensor is attached on the base plate with a widthwise space between the first element of the second image sensor and the n-th element of the first image sensor being set to a distance equal to or smaller than the photoelectric conversion element interval, based on the reference mark means on the first and second image sensors.

8. An image reading device as defined in claim 6, wherein the reference mark means includes a graduated scale.

9. An image reading device as defined in claim 6, wherein:

the substrate has a rectangular shape with two parallel short sides extending along the lengthwise direction of the document and two parallel long sides extending along the widthwise direction of the document; and the photoelectric conversion array includes a predetermined number of photoelectric conversion elements arranged along a straight line inclined at the predetermined inclination angle with respect to the long sides of the substrate.

10. An image reading device as defined in claim 6, wherein:

the substrate is shaped into a parallelogram having two parallel short sides extending along the lengthwise direction of the document and two parallel long sides extending along the widthwise direction of the document, the long sides being inclined at the predetermined inclination angle with respect to the widthwise direction of the document; and the photoelectric conversion array includes a predetermined number of photoelectric conversion elements arranged in parallel with the long sides of the substrate.

* * * * *